(12) United States Patent
Park et al.

(10) Patent No.: US 10,953,732 B2
(45) Date of Patent: Mar. 23, 2021

(54) STRUCTURE OF ELECTRIC SUNSHADE AND SUNROOF

(71) Applicants: Hyundai Motor Company, Seoul (KR); Kia Motors Corporation, Seoul (KR); Webasto Donghee Holdings, Ulsan (KR)

(72) Inventors: Jeong Hoon Park, Suwon-si (KR); Seong Min Gwak, Yangsan-si (KR); Su Yun Choi, Ulsan (KR)

(73) Assignees: Hyundai Motor Company, Seoul (KR); Kia Motors Corpoation, Seoul (KR); Webasto Donghee Holdings, Ulsan (KR)

( * ) Notice: Subject to any disclaimer, the term of this patent is extended or adjusted under 35 U.S.C. 154(b) by 100 days.

(21) Appl. No.: 16/439,410

(22) Filed: Jun. 12, 2019

(65) Prior Publication Data

US 2019/0299763 A1 Oct. 3, 2019

Related U.S. Application Data

(63) Continuation-in-part of application No. 15/798,230, filed on Oct. 30, 2017, now abandoned.

(51) Int. Cl.
| | |
|---|---|
| *B60J 7/043* | (2006.01) |
| *B60J 3/02* | (2006.01) |
| *E05F 15/655* | (2015.01) |
| *B60J 7/057* | (2006.01) |
| *B60J 7/00* | (2006.01) |

(52) U.S. Cl.
CPC ........... *B60J 7/0435* (2013.01); *B60J 7/0007* (2013.01); *B60J 7/057* (2013.01); *B60J 7/0573* (2013.01); *E05F 15/655* (2015.01); *E05Y 2900/542* (2013.01)

(58) Field of Classification Search
CPC ........ B60J 7/0435; B60J 7/057; B60J 7/0573; B60J 7/003; B60J 7/0007
USPC ............................... 296/216.02–216.05, 214
See application file for complete search history.

(56) References Cited

U.S. PATENT DOCUMENTS

| | | | |
|---|---|---|---|
| 8,366,187 B2* | 2/2013 | Mihashi ................. | B60J 7/0015 296/214 |
| 8,789,878 B2* | 7/2014 | Fraley ..................... | B60J 7/003 296/214 |
| 2014/0097645 A1* | 4/2014 | Fraley ..................... | B60J 7/003 296/215 |

FOREIGN PATENT DOCUMENTS

KR 10-2006-0055080 A 5/2006

\* cited by examiner

*Primary Examiner* — Dennis H Pedder
(74) *Attorney, Agent, or Firm* — Morgan, Lewis & Bockius LLP

(57) ABSTRACT

A structure of an electric sunshade and a sunroof may include glass sleds which both open and close a sunroof glass by sliding in a longitudinal direction along mechanism rails disposed at both sides of a roof panel of a vehicle, wherein a front sled and a rear sled are rotatably coupled to both end portions of each of glass sleds, respectively, main cable devices which are connected to a driving motor by a cable, and movable along the mechanism rails, and separately include a cable protrusion slidably accommodated in glass grooves formed in lateral surfaces of the front sled, the rear sled, and the glass sled, and sunshade sleds which are selectively coupled to the main cable devices, and slide to open or close the sunshade.

8 Claims, 15 Drawing Sheets

STRUCTURE OF ELECTRIC SUNSHADE AND SUNROOF

CROSS-REFERENCE TO RELATED APPLICATION

The present application is a Continuation-In-Part of U.S. patent application Ser. No. 15/798,230, filed Oct. 30, 2017, which claims priority to Korean Patent Application No. 10-2017-0006956, filed on Jan. 16, 2017, the entire contents of which applications are incorporated herein for all purposes by these references.

BACKGROUND OF THE INVENTION

Field of the Invention

The present invention relates to a structure of an electric sunshade and a sunroof for a vehicle. More particularly, the present invention relates to a structure of an electric sunshade and a sunroof for a vehicle, which can both open and close a sunshade and a sunroof glass integrally by use of a single driving motor, wherein a sunroof control is performed integrally by the single driving motor.

Description of Related Art

An opening may be formed on a roof panel (ceiling portion) of a vehicle to discharge the inside air of the vehicle outside or allow outside air to flow into the vehicle, and in the opening a sunroof glass is typically disposed to be open or close.

That is, various types of frames including mechanism rails are disposed on the roof panel, and the sunroof glass is vertically tilted up and down on the frame, or slides in both front and rear directions.

Recently, a panoramic sunroof, in which most of the roof panel is manufactured from sunroof glass and some of the roof panel is selectively both opened and closed, is widely used to provide complete openness and an excellent aesthetic appearance, and a driver may have a larger amount of sunlight through the panoramic sunroof.

Meanwhile, a sunroof glass is made of a transparent material and, accordingly, sunlight is directly transmitted into a vehicle. Therefore, a sunroof glass has a sunshade below, the sunshade being able to slide in both front and rear directions.

The sunshade is utilized in various ways including preventing an increase in the internal temperature of the vehicle and preventing a user from being dazzled by sunlight, and the sunshade is configured to be capable of being both open and close upon user's requests.

However, in the conventional sunroof, a sunroof glass and a sunshade are configured to be separately slid forward and rearward by two different driving motors, resulting in increases in production costs of a vehicle and the weight of a vehicle body.

Moreover, a depth of a head lining needs to be excessively large to install the two driving motors, and as a result, a rear head room deteriorates.

Sometimes, there has been used a method of operating only a sunroof glass by a driving motor and manually sliding a sunshade so that user convenience was not satisfied.

The information disclosed in this Background of the Invention section is for enhancement of understanding of the general background of the invention and is/are configured to not be taken as an acknowledgement or a form of suggestion that this information forms the prior art already known to a person skilled in the art.

BRIEF SUMMARY

Various aspects of the present invention are directed to providing a structure of an electric sunshade and a sunroof in which both the sunroof glass and the sunshade may be operated by a single driving motor, remarkably reducing production costs for a vehicle and the weight of a vehicle body.

Various aspects of the present invention are directed to providing a structure of an electric sunshade and a sunroof in which both the sunroof glass and the sunshade are operated by electric power integrally, remarkably increasing user convenience and improving marketability of a vehicle.

The present invention are not limited to the aforementioned description, and other aspects of the present invention, which are not mentioned above, may be clearly understood from the following descriptions and may become apparent from the exemplary embodiments of the present invention. In addition, the present invention may be implemented by means and a combination thereof included in the claims.

Various aspects of the present invention are directed to providing a structure of an electric sunshade and a sunroof, and the structure includes the following configurations.

Various aspects of the present invention are directed to providing a structure of an electric sunshade and a sunroof, the structure including: glass sleds which both open and close a sunroof glass by sliding in a longitudinal direction along mechanism rails disposed at both sides of a roof panel of a vehicle, and have a front sled and a rear sled at both end portions thereof, the front sled and the rear sled coupled to the both end portions of the glass sleds and rotated; main cable units which are connected to a driving motor by a cable, and movable along the mechanism rails, and separately include a cable protrusion slidably accommodated in glass grooves formed in lateral surfaces of the front sled, the rear sled, and the glass sled; and sunshade sleds which are selectively coupled to the main cable units, and slide to both open and close the sunshade, in which the sunshade sled includes stopper units that protrude in a height direction to be selectively fastened in accordance with a movement direction of the main cable device, and the sunroof glass and the sunshade of the vehicle are opened or closed by a single driving motor.

In an exemplary embodiment, the structure may include: tilt levers which are positioned at both end portions of the sunroof glass, are configured to be moved in both upward and downward directions, and separately have a tilt groove; and a tilt protrusion portion which is positioned at one side of each of the sliding glass, and configured to be movable along the tilt groove, in which when the glass sled moves forward, the tilt protrusion portion moves the tilt lever upward to tilt up the sunroof glass.

In another exemplary embodiment, the stopper units may include: a rear stopper which is configured to be movable rearward together with the main cable device; and a front stopper which is fastened to the main cable device and configured to be moved forward thereof.

In still another exemplary embodiment, the rear stopper may be unfastened from the main cable device when the sunshade is in a completely opened state.

In yet another exemplary embodiment, the front sled and the glass sled may be coupled by a front hinge, the rear sled and the glass sled may be coupled by a rear hinge, and the other end portion of each of the front sled and the rear sled, which is coupled to the glass sled, may include a shape curved toward the mechanism rail.

In still yet another exemplary embodiment, in the mechanism rail, a front constraining groove may be formed to be recessed to correspond to a position where the end portion of the front sled is seated, and a rear constraining groove may be formed to be recessed to correspond to a position where the end portion of the rear sled is seated.

In a further exemplary embodiment, a cable groove may be included in a lower surface of the main cable device, a protrusion portion positioned on an upper surface of a sunshade rotation member may be configured to be moved along the cable groove, the protrusion portion may rotate while moving along the cable groove, and the main cable device and the sunshade sled may be selectively constrained as the stopper units are selectively inserted.

In another further exemplary embodiment, the cable groove may be recessed in a 'U' shape, such that as the protrusion portion of the sunshade rotation member is rotated, the main cable device and the sunshade sled are selectively constrained.

According to an exemplary embodiment of the present invention having the aforementioned configurations, all of the operations of tilting up and down the sunroof glass, both opening and closing the sunroof glass, and both opening and closing the sunshade may be conducted by utilizing a single driving motor, and as a result, production costs for a vehicle and a weight of a vehicle body are remarkably reduced.

According to an exemplary embodiment of the present invention, a single driving motor may be substituted for two driving motors that were used to electrically operate the sunroof glass and the sunshade in the related art, remarkably reducing a thickness of a rear headroom.

According to an exemplary embodiment of the present invention, both of the sunroof glass and the sunshade may be both opened and closed by a user's simple button manipulation, remarkably improving convenience for a user, and improving marketability of a vehicle.

According to an exemplary embodiment of the present invention, the sunroof glass and the sunshade may be both opened and closed by comparatively simple structures including the glass sled, the main cable device, and the sunshade sled in a state in which unnecessary configurations in the related art are omitted, and as a result, the present invention is advantageous in terms of a package layout of a vehicle.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together are configured to explain certain principles of the present invention.

The above and other features of the invention are discussed infra.

Figure 1:
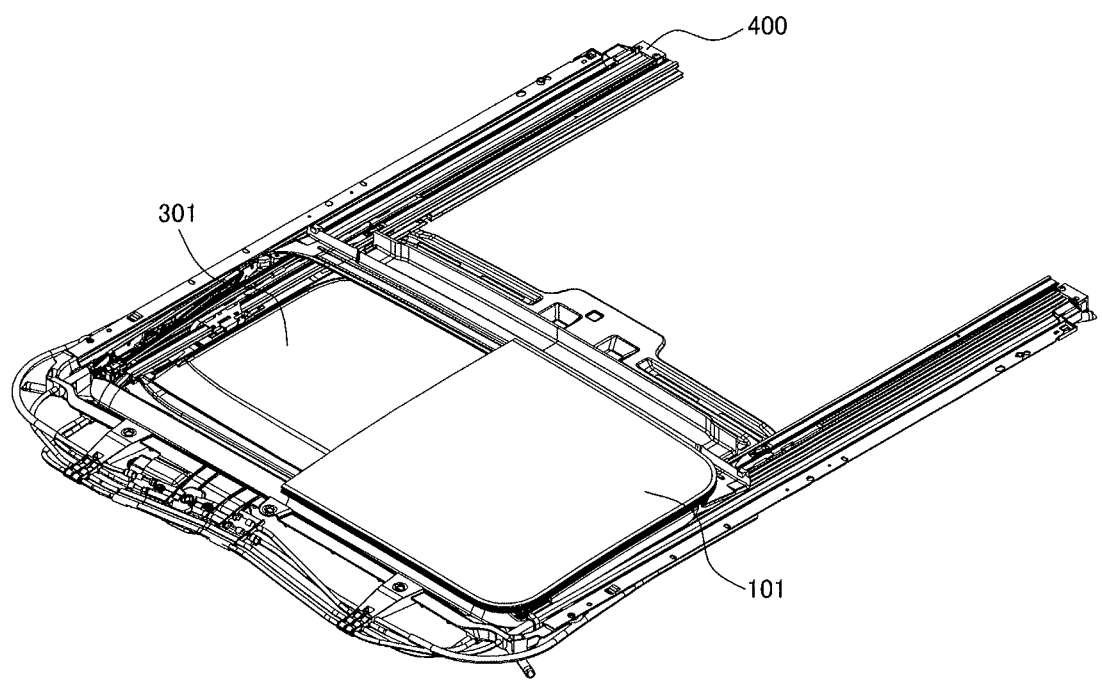
FIG. 1 illustrates a perspective view of a structure of an electric sunshade and a sunroof according to an exemplary embodiment of the present invention.

It is/are configured to be understood that the appended drawings are not necessarily to scale, presenting a somewhat simplified representation of various features illustrative of the certain principles of the invention. The predetermined design features of the present invention as disclosed herein, including: for example, predetermined dimensions, orientations, locations, and shapes will be determined partially by the intended application and use environment.

In the figures, reference numbers refer to equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in more detail with reference to the accompanying drawings. The exemplary embodiments of the present invention may be modified in various forms, and the scope of the present invention may not be interpreted as being limited to the following exemplary embodiments. The present exemplary embodiments are provided for more completely explaining the present invention to the person with ordinary skill in the art.

The term "unit", "member", or the like, which is described in the specification, signifies a device that performs at least one function or operation.

FIG. 1 is a perspective view illustrating a structure of an electric sunshade 301 and a sunroof of the present invention, and in the exemplary embodiment of the present invention, the structure includes the sunshade 301 which is disposed below a sunroof glass 101 and blocks light penetrating the sunroof glass 101.

The structure includes mechanism rails 400 for moving the sunroof glass 101, and the mechanism rails 400 are disposed at both sides of a roof panel of the vehicle. The structure includes glass sleds 100 which are disposed on the mechanism rails 400, and slide in a longitudinal direction to both open and close the sunroof glass 101.

A front sled 110 and a rear sled 120 are configured to be rotatable with respect to the glass sled 100, the front sled 110 is fastened to the glass sled 100 by a front hinge 111, and the rear sled 120 is coupled to the glass sled 100 by a rear hinge 121.

The front sled 110 and the rear sled 120 are rotatably coupled to the glass sled 100, and longitudinal glass grooves 102, which guide a movement of a cable protrusion 210 positioned on a main cable device 200, are formed in the front sled 110 and the rear sled 120.

An end portion of the front sled 110, which is distant from one end portion of the front sled 110 fastened to the glass sled 100, may be configured to be curved toward the mechanism rail 400, and an end portion of the rear sled 120, which is distant from one end portion of the rear sled 120 fastened to the glass sled 100, may be configured to be curved toward the mechanism rail 400.

The glass grooves 102, which are positioned in the front sled 110 and the rear sled 120 configured to be curved as described above, are also formed to be curved in accordance with the shapes of the front sled 110 and the rear sled 120, and therefore, when the cable protrusion 210 is positioned at the end portion of the front sled 110 or the rear sled 120, the front sled 110 or the rear sled 120 may be moved upward from the mechanism rail 400.

When the cable protrusion 210 is positioned at the end portion of the rear sled 120, the rear sled 120 may be moved upward. That is, the front sled 110 and the rear sled 120 may be configured to be moved in an up and down direction in accordance with a position of the cable protrusion 210.

The curved end portion of the front sled 110 may be inserted into a front constraining groove 410 formed in the mechanism rail 400, and the curved end portion of the rear sled 120 may be inserted into a rear constraining groove 420, such that the movement of the glass sled 100 is constrained. The front sled 110 and the rear sled 120 are moved upwards in accordance with the movement of the cable protrusion 210 positioned on the main cable device 200, releasing the constraint of the glass sled 100.

The main cable device 200, which is connected to a driving motor 500 through a cable 600 and moves in the longitudinal direction of the mechanism rail 400, includes the cable protrusion 210 configured to be slidable along the glass grooves 102 formed in lateral surfaces of the front sled 110, the rear sled 120, and the glass sled 100, and as described above, the main cable device 200 is configured to release the constraint of the glass sled 100 in accordance with the position of the cable protrusion 210.

The front sled 110 has a shape similar to a '┌' shape, and the end portion of the rear sled 120 is also formed to be curved downward, wherein the rear sled 120 is configured to entirely have a shape similar to a '┐' shape.

The glass grooves 102 positioned in the lateral surfaces of the front sled 110 and the rear sled 120 are also formed to have shapes similar to the shapes of the front sled 110 and the rear sled 120 to release the constraint of the entire glass sled 100 when the cable protrusion 210 is moved.

The present invention includes a sunshade sled 300 which is selectively fastened to the main cable device 200 and configured to be movable, one end portion of the sunshade sled 300 is connected to the sunshade 301, and the sunshade sled 300 is configured to control the opening or closing of the sunshade 301 in accordance with the movement of the main cable device 200.

The sunshade sled 300 in an exemplary embodiment of the present invention includes stopper units 310 and 320 which protrude in a height direction to be selectively fastened to the main cable device 200, wherein the sunshade sled 300 is configured to be selectively coupled to the main cable device 200 configured to be moved on an upper surface of the sunshade sled 300.

The sunshade sled 300 includes at least two stopper units 310 and 320, that is, a front stopper 310 and a rear stopper 320, and at least the rear stopper 320 may be configured to be coupled to the main cable device 200 to allow the sunshade sled 300 to move along the main cable device 200.

The front stopper 310 and the rear stopper 320 are configured to be fastened to a front stopper constraining groove 430 and a rear stopper constraining groove 440, respectively, which are configured to be positioned on the mechanism rail 400.

The front stopper constraining groove 430 and the rear stopper constraining groove 440 are configured to be positioned on a separate rail positioned inside the mechanism rail 400 along which the glass sled 100 moves, and the sunshade sled 300 moves along the separate rail.

That is, the glass sled 100 and the sunshade sled 300 may be moved in the longitudinal direction of the vehicle along the different rails.

The glass sled 100 may move along a rail positioned at an outermost side of the mechanism rail 400, and the main cable device 200, which is configured to be fastened to the glass sled 100, may move along a separate rail at a position adjacent to the glass sled 100, and may include a separate rail configured such that the sunshade sled 300 is positioned at a position adjacent to the inside of the main cable device 200 and moves in the longitudinal direction of the vehicle.

In summary, the mechanism rail 400 according to the present invention is configured to include at least three rails, and each or two or more of the glass sled 100, the main cable device 200, and the sunshade sled 300 are fastened to the rails so as to be moved in the longitudinal direction of the vehicle.

The sunshade sled 300 is configured to include the front stopper constraining groove 430 and the rear stopper constraining groove 440 which are configured to selectively open and close the front and rear stoppers 310 and 320, and is configured so that the front stopper 310 is inserted into the front stopper constraining groove 430 by its own weight.

That is, the sunshade sled 300 is fixed by the front stopper 310 inserted into the front stopper constraining groove 440.

A rear end of the front stopper constraining groove 430 includes an inclined portion, such that the front stopper 310 is released from the front stopper constraining groove 430 along the inclined portion when the main cable device 200 moves the sunshade sled 300 rearward.

When the sunshade sled 300 moves from the rear side toward the front side, the front stopper 310 may be fixed by being inserted into the front stopper constraining groove 430 by its own weight.

The sunshade sled 300 includes a sunshade rotation member 330 configured to allow the stoppers 310 and 320 to be inserted into the stopper constraining grooves 430 and 440, respectively.

Since the sunshade sled 300 also includes the rear stopper constraining groove 440 is positioned at the rear side of the mechanism rail 400, the rear stopper 320 is fixed by being inserted into the rear stopper constraining groove 440 by its own weight when the sunshade sled 300 moves to a position corresponding to the rear stopper constraining groove 440.

When the sunshade sled 300 is moved forward by the main cable device 200, the rear stopper 320 may be released from the rear stopper constraining groove 440 along the inclined portion positioned at the front end of the rear stopper constraining groove 440.

The sunshade rotation member 330 may be configured to fix a movement of the sunshade sled 300 by being positioned on the upper surface of the front stopper 310 or the rear stopper 320 in the state in which the front stopper 310 or the rear stopper 320 is inserted into the stopper constraining groove 430 or 440.

The sunshade rotation member 330, which is formed to fix the stoppers 310 and 320, has a protrusion portion 331 positioned on the sunshade rotation member 330, and the protrusion portion 331 is positioned below the main cable device 200 to be moved along a cable groove 220.

The cable groove 220 is positioned in the main cable device 200 and configured to face the sunshade sled 300. The cable groove 220 is positioned to guide a movement of the protrusion portion 331 of the sunshade rotation member 330.

The protrusion portion 331 is configured to move along the cable groove 220 to rotate the sunshade rotation member 330. The cable groove 220 rotates the sunshade rotation member 330 so that the sunshade rotation member 330 is positioned on an upper surface of the rear stopper 320 when the sunshade sled 300 moves toward the rear side of the vehicle and the rear stopper 320 is inserted into the rear stopper constraining groove 440.

On the contrary, the cable groove 220 rotates the sunshade rotation member 330 so that the sunshade rotation member 330 is positioned on an upper surface of the front stopper 310 when the sunshade sled 300 moves toward the front side of the vehicle and the front stopper 310 is inserted into the front stopper constraining groove 430.

In summary, the cable groove 220 guides the sunshade rotation member 330 so that the sunshade rotation member 330 rotates in the longitudinal direction on the sunshade sled 300. Accordingly, at a position at which the sunshade sled 300 faces the front stopper constraining groove 430, the front stopper 310 is inserted into the front stopper constraining groove 430, and the sunshade rotation member 330 rotates forward along the cable groove 220 so as to be positioned on the upper surface of the front stopper 310.

At a position at which the sunshade sled 300 faces the rear stopper constraining groove 440, the rear stopper 320 is inserted into the rear stopper constraining groove 440, and the cable groove 220 guides the sunshade rotation member 330 so that the sunshade rotation member 330 is positioned on the upper surface of the rear stopper 320.

That is, as the cable moves rearward, the main cable device 200 moves the sunshade sled 300 and the glass sled 100 integrally and releases a fastened state between the sunshade sled 300 and the main cable device 200 after the sunshade 301 is completely opened.

To release the fastened state between the sunshade sled 300 and the main cable device 200, the rear stopper 310 positioned on the sunshade sled 300 is inserted into the rear stopper constraining groove 440, and the main cable device 200 is additionally moved backward in the longitudinal direction of the vehicle in the state in which the sunshade sled 300 is constrained in the rear stopper constraining groove 440.

In the state in which the sunshade 301 is completely opened, the main cable device 200 may move the glass sled 100, thereby opening the sunroof glass 101.

That is, the main cable device 200 is moved toward the rear side of the vehicle along the glass groove 102, and the sunshade sled 300 is moved rearward by the main cable device 200, such that the sunshade 301 is opened prior to open the sunroof glass 101.

In the state in which the sunshade 301 is completely opened, the rear sled 120 and the main cable device 200 are fastened, and the entire glass sled 100 for fixing the sunroof glass 101 is moved toward the rear side of the vehicle along the main cable device 200, thereby opening the sunroof. In summary, with the configuration of the inserted stopper, the main cable device 200, which moves on the upper surface of the sunshade sled 300, is unfastened from the sunshade sled 300 in the state in which the sunshade 301 is completely opened, thereby moving only the glass sled 100 rearward.

The sunshade sled 300, which is selectively fastened to the main cable device 200 as described above, will be described below in accordance with opened states of the sunroof glass 101 and the sunshade 301.

Figure 2:
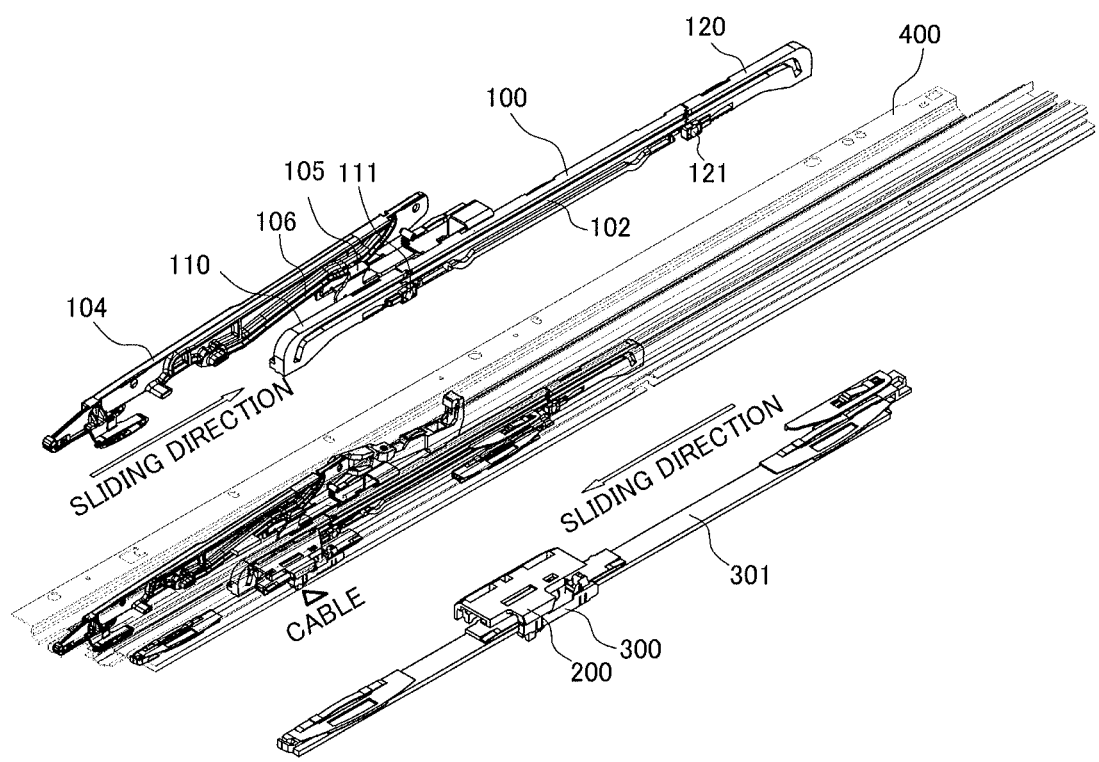
FIG. 2 illustrates coupling relationships among constituent elements on a mechanism rail of the structure of the electric sunshade and the sunroof according to the exemplary embodiment of the present invention.
Figure 3:
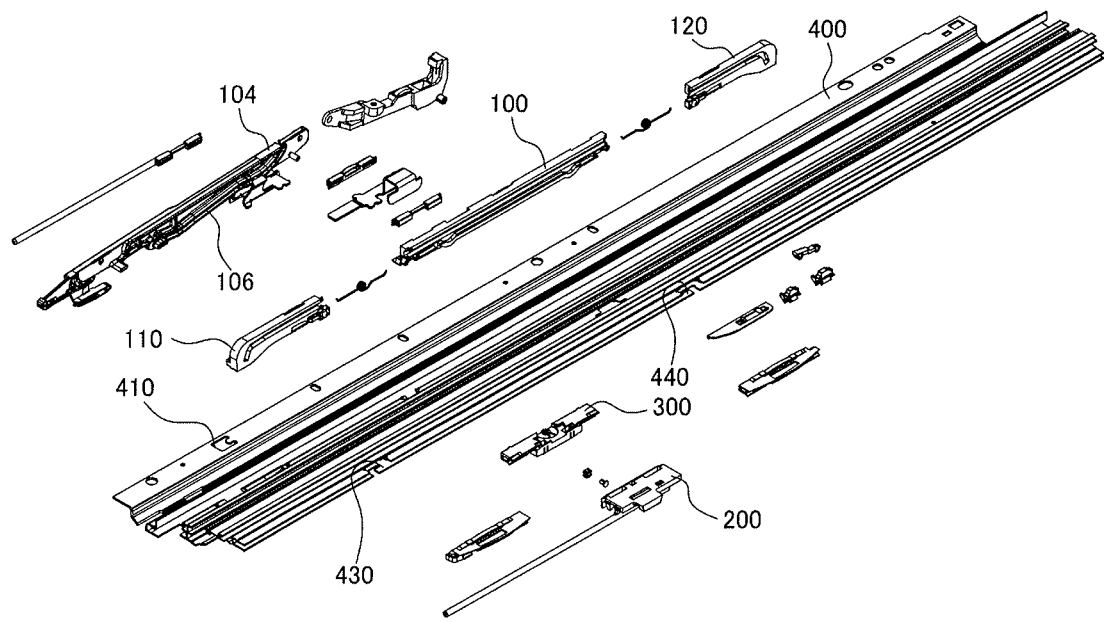
FIG. 3 illustrates sub-components of the constituent elements of the structure of the electric sunshade and the sunroof according to the exemplary embodiment of the present invention.

FIG. 2 and FIG. 3 illustrate coupling relationships among separate constituent elements of the structure of electric sunshade 301 and the sunroof according to an exemplary embodiment of the present invention.

As illustrated, the main cable device 200 includes the glass sled 100 which is positioned on the mechanism rail 400 and fixed to the sunroof glass 101, and the cable protrusion 210 which is connected to the driving motor 500 by the cable 600 and moves along the glass groove 102 positioned in an internal surface of the glass sled 100.

The sunshade 301 includes the sunshade sleds 300 which are positioned below the sunroof glass 101 and fixed to both sides of the sunshade 301. The main cable device 200 is configured to be moved on the upper surface of the sunshade sled 300, and the main cable device 200 and the sunshade sled 300 are configured to be selectively constrained.

Tilt levers 104, which are connected to both end portions of the glass 101, are included and configured to be moved in the up and down direction. The protrusion portions 331 and 105 move along the tilt lever 104 including a tilt groove 106, and when the glass sled 100 moves forward, the protrusion portions 331 and 105 move the tilt lever 104 upward, tilting up and opening the sunroof glass 101.

In a state in which the sunroof and the sunshade 301 are closed, the main cable device 200 in an exemplary embodiment of the present invention is positioned at the end portion of the front sled 110, and the front sled 110 is fixed to the front constraining groove 410, constraining the glass sled 100.

To tilt up the sunroof glass 101, the main cable device 200 moves forward, and the cable protrusion 210 moves along the glass groove 102, such that the front sled 110 is moved upward and released from the front constraining groove 410, and the glass sled 100 is moved forward thereof. As the glass sled 100 moves forward as described above, the tilt protrusion portion 105 connected to one end portion of the glass sled 100 moves along the tilt groove 106 of the tilt lever 104, such that the tilt lever 104 moves upward, tilting up the sunroof.

The tilt protrusion portion 105 is positioned on the front sled 110, such that when the main cable device 200 moves the front sled 110 forward, the tilt protrusion portion 105 moves forward along the tilt groove 106, and the tilt lever 104 including the tilt groove 106 moves in the height direction of the vehicle, thereby tilting the sunroof glass 101.

When the main cable device 200 moves rearward along the glass groove 102 in the state that a sunroof is closed, the sunshade sled 300 moves in conjunction with the main cable device 200.

However, the glass sled 100 may be maintained in a fixed state until the cable protrusion 210 of the main cable device 200 is positioned at the end portion of the rear sled 120. Therefore, when the cable protrusion 210 of the main cable device 200 is positioned at the end portion of the glass groove 102, the sunshade 301 is in a completely opened state, and the sunroof glass 101 begins to move.

When the sunshade 301 is in the completely opened state, the main cable device 200 is uncoupled from the sunshade sled 300, such that the sunroof glass is opened as the main cable device 200 moves the glass sled 100 rearward.

When the sunshade 301 is completely opened, the fastened state between the sunshade sled 300 and the main cable device 200 is released, the cable protrusion 210 of the main cable device 200 moves the rear sled 120 upward so that the end of the rear sled 120 is inserted into the mechanism rail 400 to release the constrained state. After the constrained state between the rear sled 120 and the mechanism rail 400 is released, the main cable device 200 and the end of the rear sled 120 are integrally moved toward the rear side of the vehicle.

Therefore, the glass sled 100 moves rearward, and the sunroof glass 101 integrally moves toward the rear side of the vehicle, such that the sunroof is opened.

Figure 4:
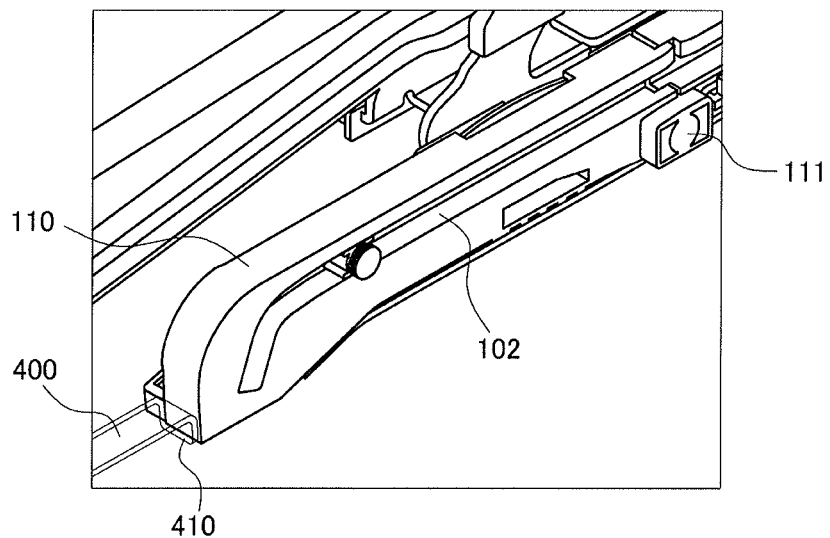
FIG. 4 illustrates an enlarged view of a front sled of the structure of the electric sunshade and the sunroof according to the exemplary embodiment of the present invention.

FIG. 4 illustrates the front constraining groove 410 which constrains the front sled 110 according to the exemplary embodiment of the present invention.

As described above, the end portion of the front sled 110 has a shape curved toward the mechanism rail 400, and the front sled 110 is fixed by the front constraining groove 410 positioned at the mechanism rail 400.

The front constraining groove 410 is configured such that a front end portion of the front sled 110 is positioned and inserted into the front constraining groove 410 in the state in which the sunroof glass 101 and the sunshade 301 are completely closed, thereby constraining the movement of the glass sled 100.

One end portion of the front sled 110 is configured to have a downward curvature, and when the cable protrusion 210 of the main cable device 200 is positioned at the front end portion of the glass groove 102, one end portion having the curvature is inserted into the front constraining groove 410.

The end portion of the rear sled 120, which is configured to correspond to the end portion of the front sled 110, also has a shape curved to have a predetermined curvature toward the mechanism rail 400, and the rear sled 120 is constrained by the rear constraining groove 420.

The constraint relationship between the front constraining groove 410 fastened to the front sled 110 and the rear constraining groove 420 fastened to the rear sled 120 may be released in accordance with the movement of the cable protrusion 210.

The front constraining groove 410 may include the inclined portion positioned at the rear side thereof, such that one end portion of the front sled 110 may be moved integrally with the cable protrusion 210 along the inclined portion. The rear constraining groove 420 may include the inclined portion positioned at the front side thereof, such that one end portion of the rear sled 120, which is inserted into the rear constraining groove 420, may be moved along the inclined portion when the cable protrusion 210 moves forward.

As described above, the front constraining groove 410 and the rear constraining groove 420 may constrain the movement of the glass sled 100.

One end portion of the front sled 110 is fastened to the front constraining groove 410 and one end portion of the rear sled 120 is fastened to the rear constraining groove 420 before moving the sunroof glass 101 (until the sunshade is completely opened).

Figure 5:
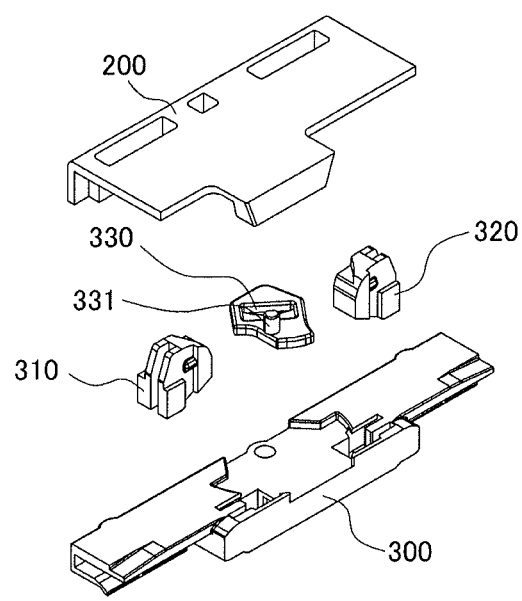
FIG. 5 illustrates an exploded view of a main cable device and a sunshade sled of the structure of the electric sunshade and the sunroof according to the exemplary embodiment of the present invention.

FIG. 5 illustrates a configuration between the sunshade sled 300 and the main cable device 200 according to the exemplary embodiment of the present invention.

The main cable device 200 is configured to move along the upper surface of the sunshade sled 300 or move together with the sunshade sled 300, and the main cable device 200 may be selectively constrained by the configuration of the stopper units 310 and 320 positioned on the sunshade sled 300.

That is, the main cable device 200 and the sunshade sled 300 are integrally moved when the stopper unit 310 or 320 is not inserted into the front stopper constraining groove 430 or the rear stopper constraining groove 440.

The sunshade sled 300 includes at least the two stopper units 310 and 320, and the two stopper units 310 and 320 are configured to be selectively inserted in accordance with a movement direction of the main cable device 200. In the exemplary embodiment of the present invention, the sunshade sled 300 may include the front stopper 310 and the rear stopper 320.

The sunshade sled 300 includes the front and rear stopper constraining grooves 430 and 440 into which the stopper units 310 and 320 are inserted, and before the main cable device 200 is initially connected to the sunshade sled 300, the front stopper 310 may be positioned and inserted into the front stopper constraining groove 430.

Since the rear stopper constraining groove 440 may be provided at a position at which the rear stopper 320 is inserted, the rear stopper constraining groove 430 may be formed at the position of the rear stopper 320 when the sunshade 301 is in the completely opened state.

When the main cable device 200 faces the sunshade sled 300 and the main cable device 200 and the sunshade sled 300 are integrally moved toward the rear side of the vehicle, the front stopper 310 protrudes in the height direction of the vehicle from the front stopper constraining groove 430.

The protrusion portion 331 positioned on the sunshade rotation member 330 is rotated by the cable groove 220 positioned in the main cable device 200 in order to open the upper side of the front stopper 310, and the constrained state is released so that the front stopper 310 protrudes in the height direction along the inclined portion of the front stopper constraining groove 430 and the sunshade sled 300 is moved.

The main cable device 200 faces the rear stopper 320 of the sunshade sled 300 and moves rearward, and the sunshade sled 300 moves to the position at which the rear stopper 320 faces the rear stopper constraining groove 440.

When the sunshade 301 is in the completely opened state, the main cable device 200 and the sunshade sled 300 are uncoupled, and the main cable device 200, which is uncoupled as the rear stopper 320 is inserted into the rear stopper constraining groove 440, may independently move rearward.

The main cable device 200, which moves toward the rear side of the sunroof independently of the sunshade sled 300 as described above, opens the sunroof glass 101 by moving the entire glass sled 100 toward the rear side of the vehicle through the cable protrusion 210 fastened to the end of the rear sled 120.

At one side at which the main cable device 200 and the sunshade sled 300 face each other, the sunshade rotation member 330 including the protrusion portion 331 is positioned between the front stopper 310 and the rear stopper 320.

Thereafter, the protrusion portion 331 moves along the cable groove 220 positioned in the lower surface of the main cable device 200, and when the rear stopper 320 is inserted into the rear stopper constraining groove 440, the protrusion portion 331 moves along the cable groove 220 to rotate the sunshade rotation member 330.

The rotated sunshade rotation member 330 is positioned on the upper surface of the rear stopper 320 so that the rear stopper 320 is fixed by being inserted into the rear stopper constraining groove 440, thereby preventing the sunshade 301 from swinging.

Figure 6A:
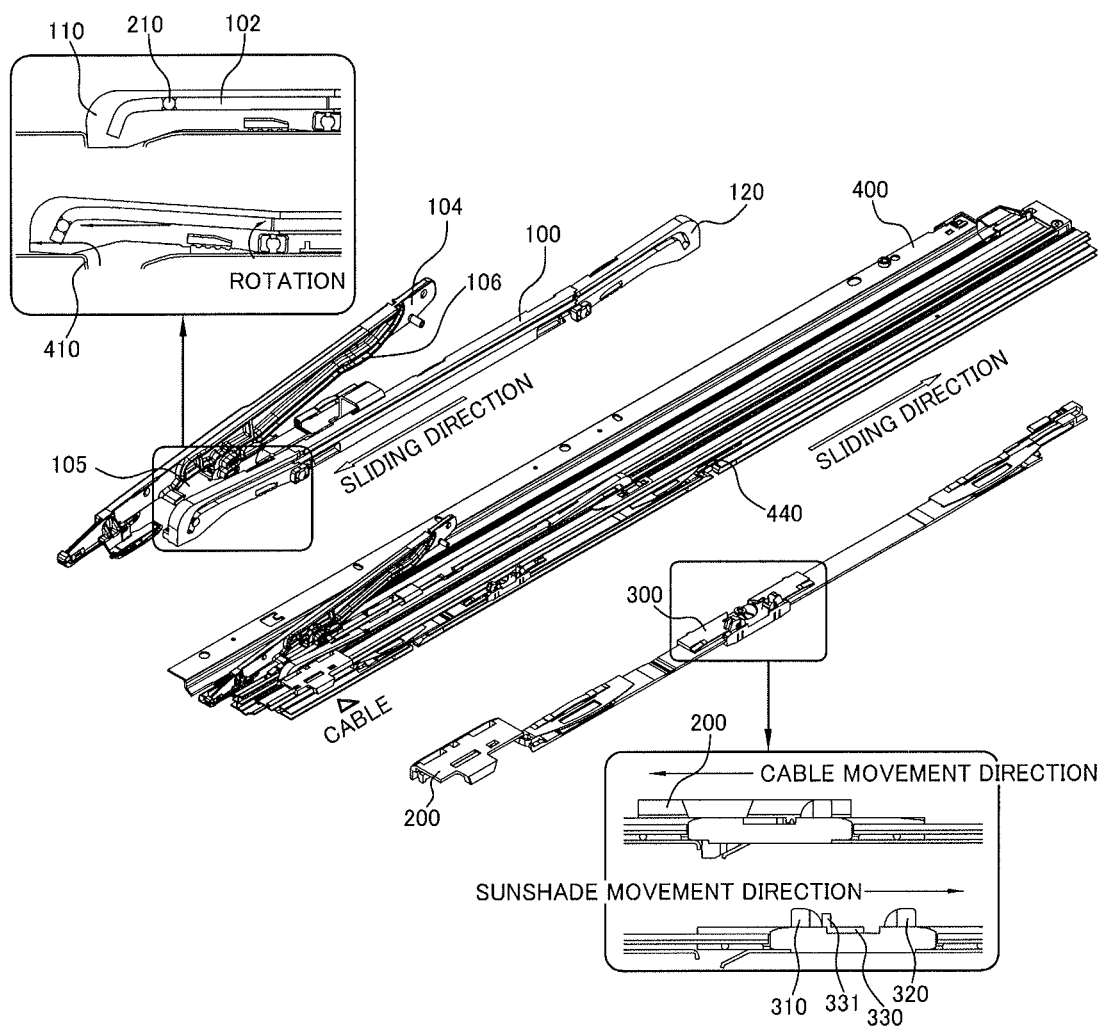
FIG. 6A illustrates a configuration view of a tilting state of the structure of the electric sunshade and the sunroof according to the exemplary embodiment of the present invention.

FIG. 6A is an operation view illustrating a state in which the sunroof is tilted up according to the exemplary embodiment of the present invention.

The cable protrusion 210 of the main cable device moves to a front end portion of the front sled 110 to move the glass sled 100, the tilt protrusion portion 105 connected to the one end portion of the glass sled 100 moves along the tilt groove 106 of the tilt lever 104, and the tilt lever 104 moves upward, tilting up the sunroof.

When tilting up the sunroof, the cable moves forward, and thus the main cable device 200 moves forward, tilting up the sunroof.

The tilt protrusion portion 105 moves forward along the tilt groove 106, and the tilt groove 106 is configured such that the rear end of the tilt lever 104 is moved upward.

The sunshade sled 300, which is configured to move in a direction opposite to the movement direction of the cable, may be configured to be moved in an opening direction.

Figure 6B:
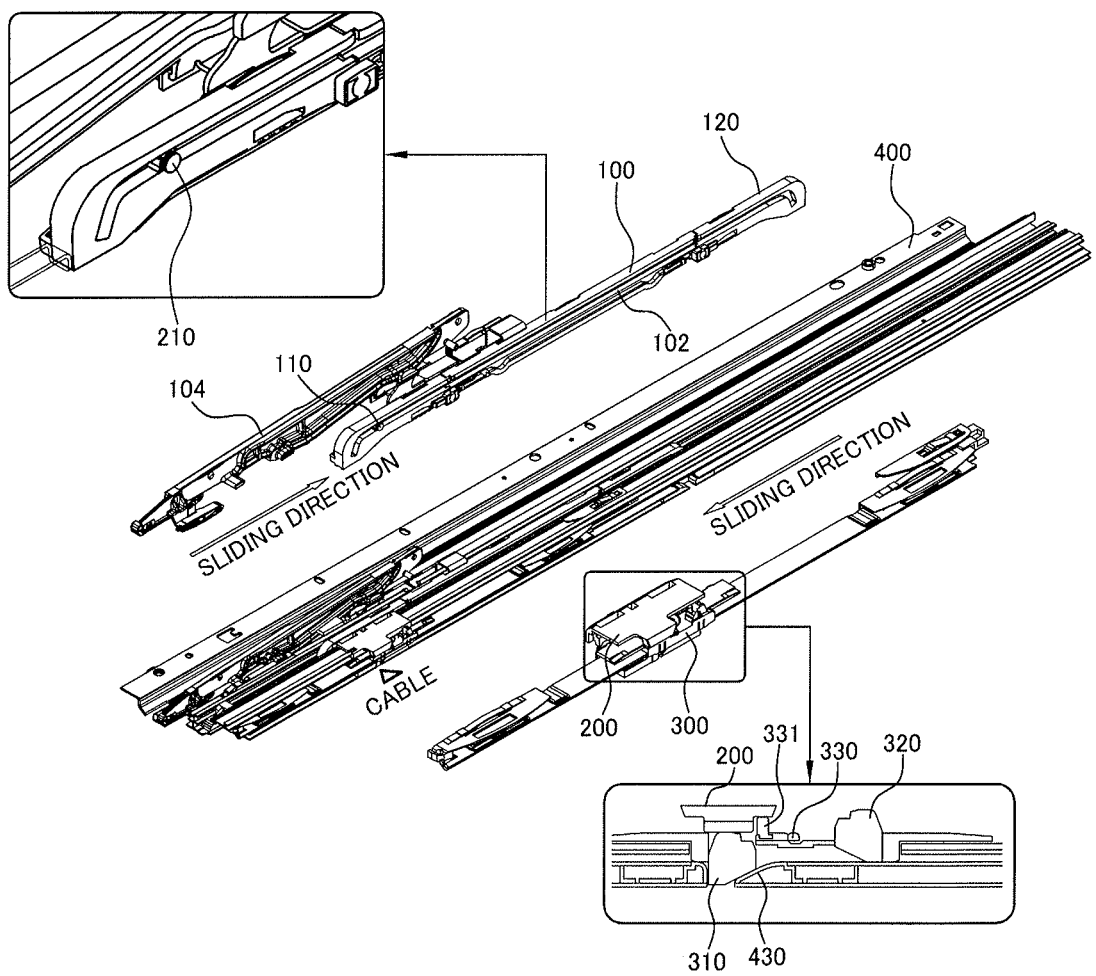
FIG. 6B illustrates a configuration view of a closed state of the structure of the electric sunshade and the sunroof according to the exemplary embodiment of the present invention.

FIG. 6B illustrates a state in which the constituent elements are fastened when the sunroof is in the closed state according to the exemplary embodiment of the present invention. The front sled 110 is inserted into the front constraining groove 410 such that the glass sled 100 is fixed.

The cable protrusion 210 positioned on the main cable device 200 is positioned in the glass groove 102, and the cable protrusion 210 is configured to be positioned in the glass groove 102 horizontally formed in the front sled 110.

Figure 6C:
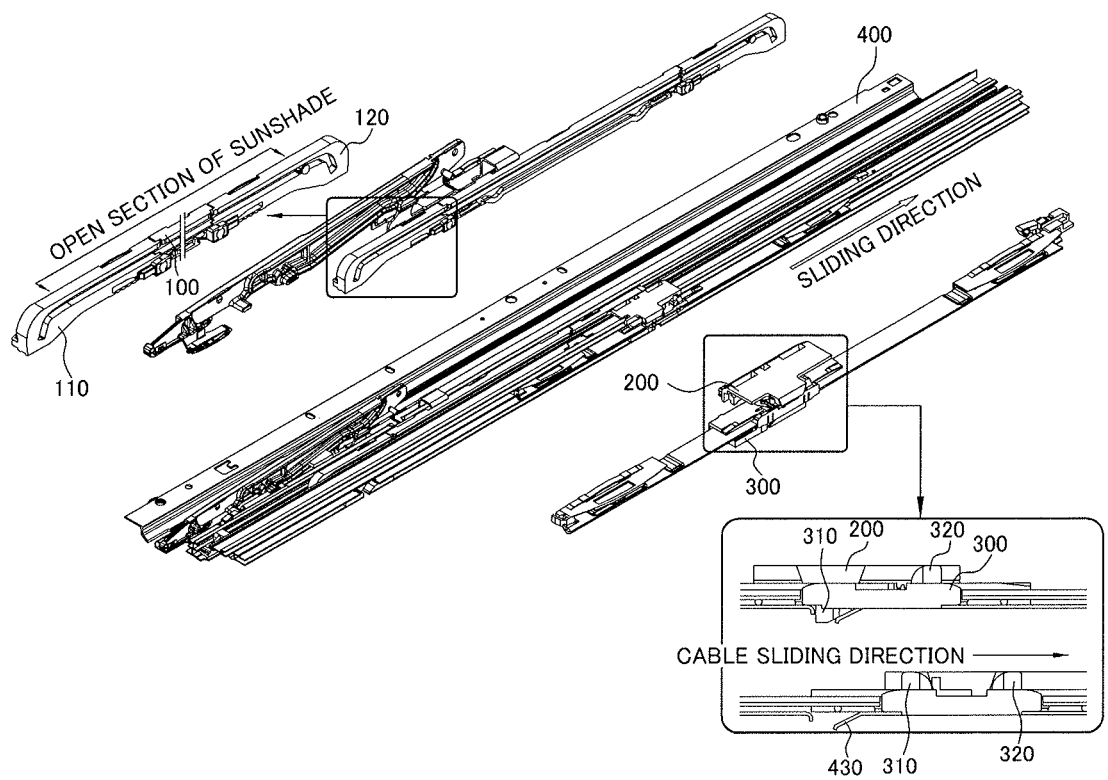
FIG. 6C illustrates a configuration view of an opened state of a sunshade of the structure of the electric sunshade and the sunroof according to the exemplary embodiment of the present invention.

FIG. 6C is an operation view illustrating a state in which the sunroof sunshade 301 is opened according to the exemplary embodiment of the present invention.

When the main cable device 200 moves toward the rear side of the sunroof along the glass groove 102 in the state illustrated in FIG. 6B, the sunshade sled 300 connected to the main cable device 200 operates correspondingly to open the sunshade 301. As the main cable device 200 moves along a horizontal portion of the glass groove 102, the sunshade 301 is opened.

When the main cable device 200 moves along the horizontal portion of the glass groove 102, the main cable device 200 is fastened to the sunshade sled 300 positioned below the main cable device 200. That is, when the main cable device 200 comes into contact with the rear stopper 320 and moves rearward, the front stopper 310, which is positioned and inserted into the front stopper constraining groove 430, moves along the inclined portion of the front stopper constraining groove 430 such that the main cable device 200 protrudes to surround the rear end of the moving front stopper 310.

Therefore, the main cable device is fastened to the sunshade sled 300 and moves along the horizontal portion of the glass groove 102, and the sunshade 301 connected to the sunshade sled 300 is opened.

Figure 6D:
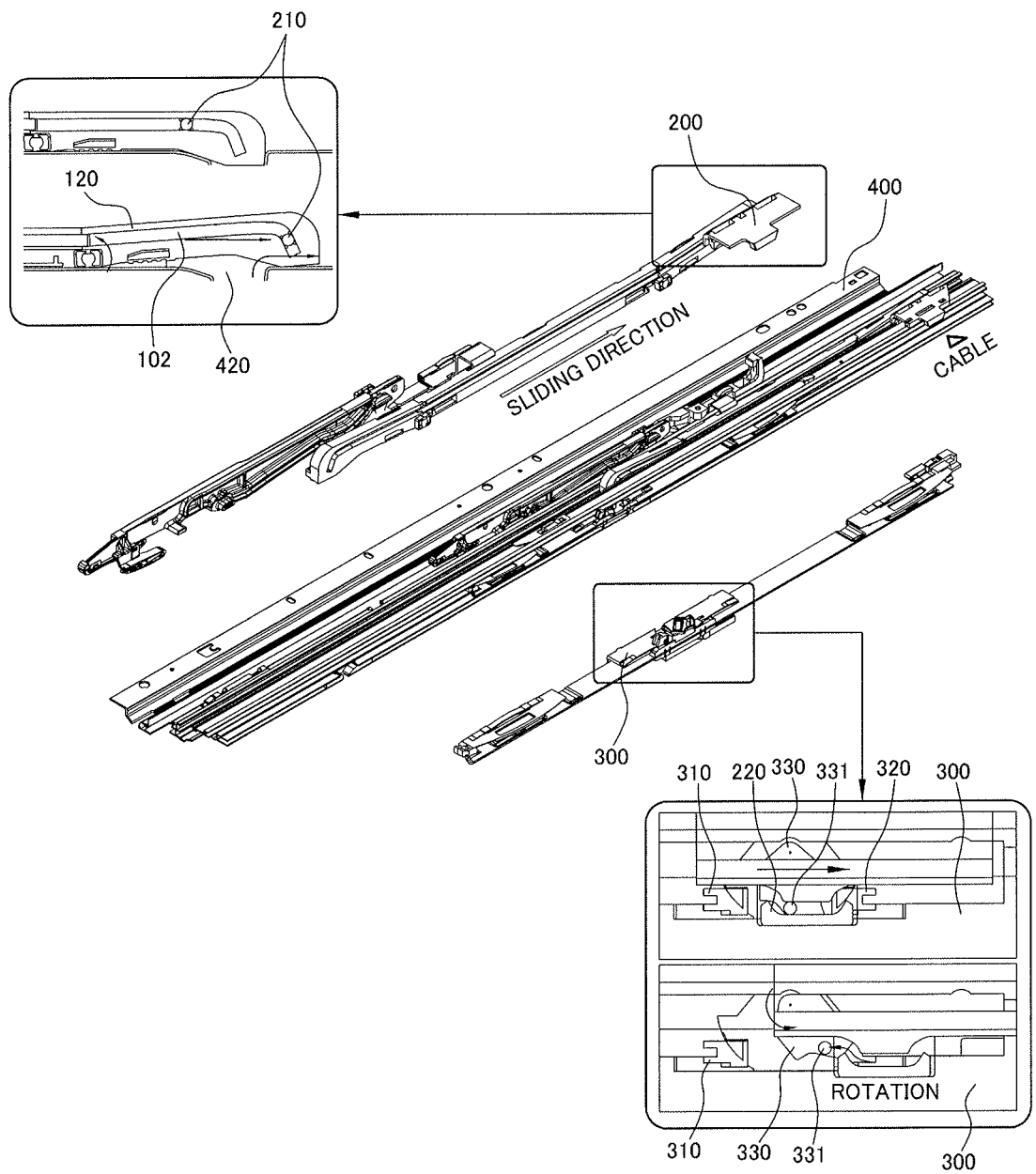
FIG. 6D illustrates a configuration view of an opened state of a glass of the structure of the electric sunshade and the sunroof according to the exemplary embodiment of the present invention.

FIG. 6D is an operation view illustrating a state in which the sunroof glass 101 is completely opened according to the exemplary embodiment of the present invention.

In the portion as illustrated in FIG. 6C in which the sunshade 301 is completely opened, the rear sled 120 is positioned and fixed by being inserted into the rear constraining groove 420. However, when the constraint of the main cable device 200 is released from the sunshade sled 300 and the main cable device 200 moves along the curved glass groove 102 positioned at the end portion of the rear sled 120 after the sunshade 301 is completely opened, the rear sled 120 moves upward to move away from the rear constraining groove 420.

After the constraint of the rear sled 120 is released as described above, the glass sled 100 moves rearward integrally with the main cable device 200, such that the sunroof glass fixedly positioned on the glass sled 100 is opened.

The cable protrusion 210, which moves inside the glass groove 102, moves to come into contact with the rear end portion of the rear sled 120, and the main cable device 200 and the rear sled 120 are integrally moved.

The rear stopper 320 positioned on the sunshade sled 300 is inserted into the rear stopper constraining groove 440 to release the fastened state between the main cable device 200 and the sunshade sled 300.

Therefore, the main cable device 200, together with the end portion of the rear sled 120, moves toward the rear side of the sunroof, completely opening the sunroof glass 101.

Figure 7:
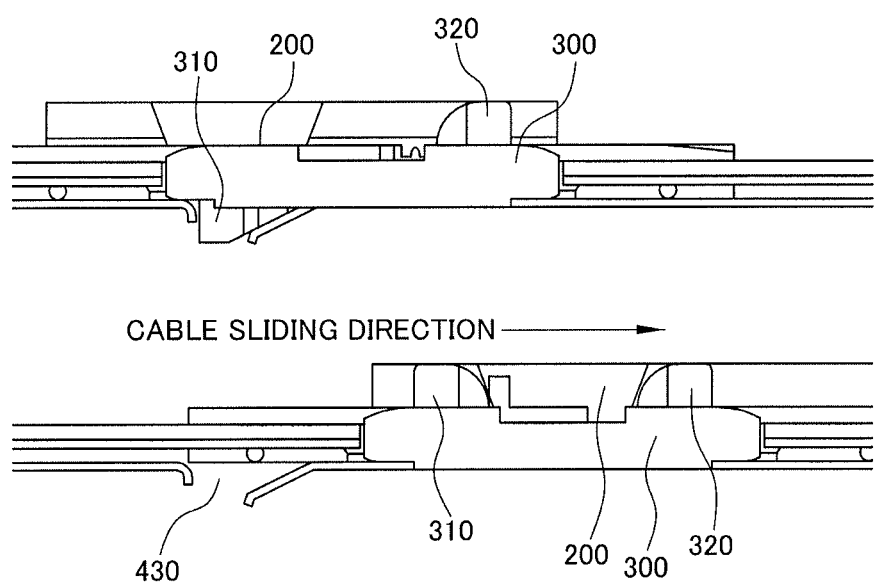
FIG. 7 illustrates a state in which the sunshade sled of the structure of the electric sunshade and the sunroof according to the exemplary embodiment of the present invention is moved rearward.

FIG. 7 is an operation view illustrating a fastening relationship between the sunshade sled 300 and the main cable device 200 according to the exemplary embodiment of the present invention.

The main cable device 200 and the sunshade sled 300 are coupled to each other and move toward the rear side of the sunroof to open the sunshade 301, and since the rear stopper 320 and the front stopper 310 are formed to surround the main cable device 200, the sunshade sled 300, together with the main cable device 200, is moved rearward.

That is, in the closed state of the sunshade 301 and the sunroof glass 101, the main cable device 200 moves toward the rear side of the vehicle to open the sunshade 301, and the main cable device 200 is fastened to the sunshade sled 300 positioned below the main cable device 200.

To move the main cable device 200 toward the rear side of the vehicle, one end portion of the main cable device 200 is configured to come into contact with the rear stopper 320, such that power transmitted from the main cable device 200 is applied to the sunshade sled 300 including the rear stopper 320.

When the main cable device 200 faces the sunshade sled 300, the front stopper 310 positioned on the sunshade sled 300 protrudes from the front stopper constraining groove 430.

When the main cable device 200 moves rearward together with the rear stopper 320, the front stopper 310 protrudes upward from the front stopper constraining groove 430 to surround the main cable device 200.

Therefore, the main cable device 200 and the sunshade sled 300 are fastened to each other to be surrounded by the rear stopper 320 and the front stopper 310, the cable protrusion 210 of the main cable device 200, together with the sunshade sled 300, moves along the glass groove 102 in the horizontal section.

The glass groove 102 in the horizontal portion has a distance identical to a movement distance of the sunshade sled 300 for completely opening the sunshade 301.

Figure 8:
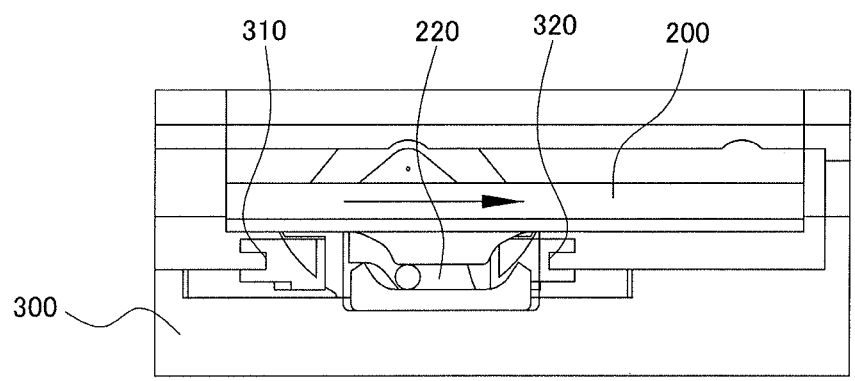
FIG. 8 illustrates an operation when the sunshade sled and the main cable device of the structure of the electric sunshade and the sunroof according to the exemplary embodiment of the present invention are released.
Figure 8:
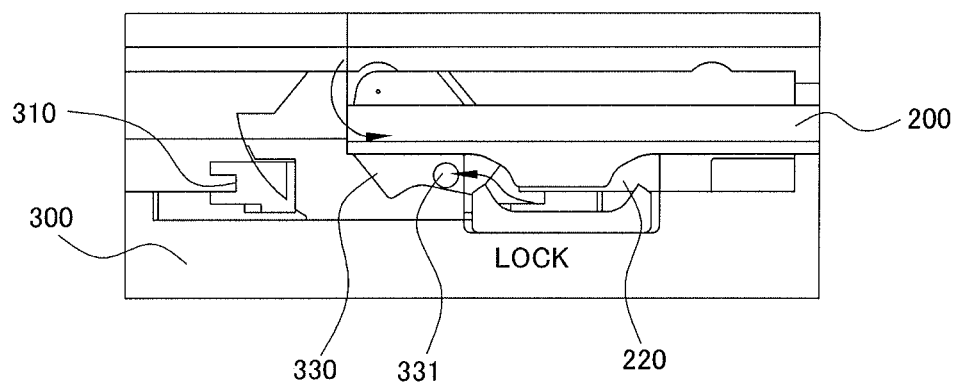

FIG. 8 illustrates an operation in which the sunshade sled 300 and the main cable device 200 are unfastened after the sunshade 301 is completely opened according to the exemplary embodiment of the present invention.

As illustrated, the rear stopper 320 and the front stopper 310 of the sunshade sled 300 move in a state of being fastened to surround the main cable device 200, and after the sunshade 301 is completely opened, the main cable device 200 and the sunshade sled 300 are uncoupled.

That is, after the sunshade 301 is completely opened, the rear stopper 320 is inserted into the stopper constraining groove 430, such that the main cable device 200 moves toward the rear side of the vehicle independently of the sunshade sled 300. The sunshade rotation member 330 including the protrusion portion 331 moves along the cable groove 220 of the main cable device 200, and after the rear stopper 320 is inserted into the rear stopper constraining groove 440 by its own weight, the protrusion portion 331 moves along the cable groove 220, and the sunshade rotation member 330, which operates in conjunction with the protrusion portion 331, is rotated, such that the sunshade sled 300 is positioned on the upper surface of the inserted rear stopper 320.

The cable groove 220, which is configured to rotate the sunshade rotation member 330, is recessed in a 'U' shape, such that the sunshade sled 300 may be positioned selectively on the upper surface of the front stopper 310 and the upper surface of the rear stopper 320 as the protrusion portion 331 of the sunshade rotation member 330 moves along the cable groove 220.

That is, in the present invention, as a constituent element for preventing the protrusion of the rear stopper 320 by the main cable device 200 that moves rearward, the sunshade rotation member 330 is moved to the upper surface of the rear stopper 320, and the protrusion portion 331 is moved along the cable groove 220 such that the sunshade rotation member 330 positioned on the upper surface of the rear stopper 320 rotates toward the front side of the vehicle when the main cable device 200 moves forward.

When the main cable device 200 moves toward the front side of the vehicle, the rear stopper 320 is moved toward the front side of the vehicle by the sunshade sled 300 fastened to the main cable device 200, and the rear stopper 320 moves along the inclined portion positioned at the front side of the rear stopper constraining groove 440.

That is, the main cable device 200 and the sunshade sled 300 are selectively constrained in accordance with the movement direction of the main cable device 200.

Figure 9:
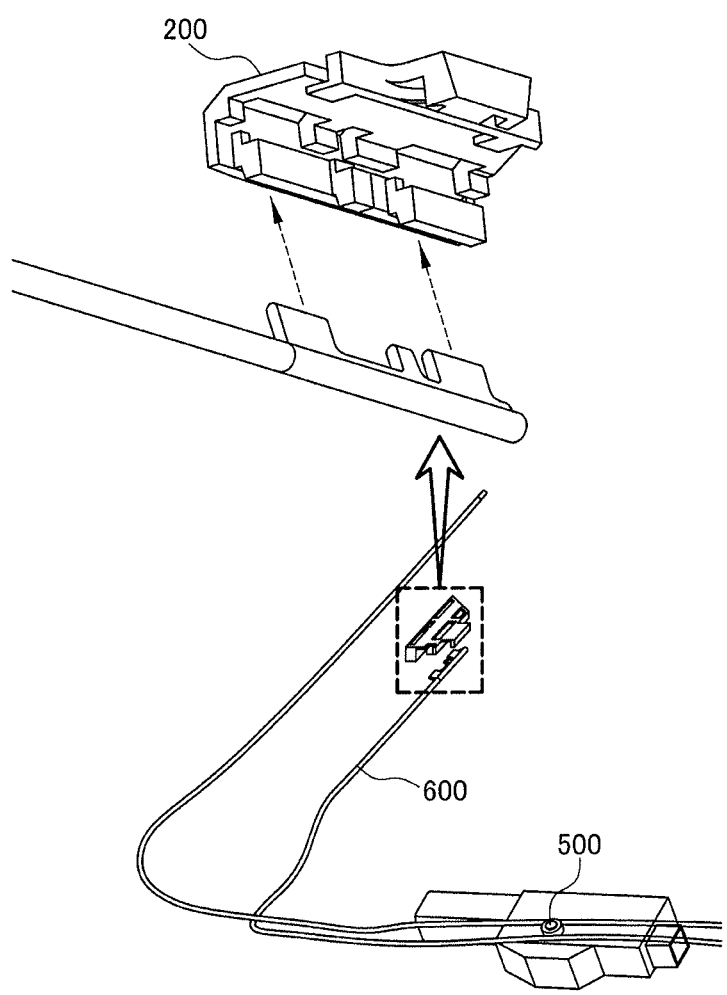
FIG. 9 illustrates a cable and a main cable unit which move along the mechanism rail according to one embodiment of the present invention.

FIG. 9 is a configuration view illustrating a state in which the main cable device 200 is operated by the cables 600 fastened to the single motor 500.

As illustrated, the motor 500 is positioned at least at one end portion of the sunroof, and the cables 600 are provided to be positioned adjacent to the motor.

The cables 600 are configured to be in contact with both surfaces of a central shaft of the motor 500, and the cable 600 is configured to be fixed to one end portion of the main cable device 200.

A cable insertion portion may be configured to be inserted into a slot positioned at a rear side of the main cable device 200, and power applied from the motor 500 may be transmitted to the main cable device 200 through the cables 600.

The cables 600 are configured to be moved in the longitudinal direction along the mechanism rails 400 positioned at both sides of the roof of the vehicle, and the cables 600 are configured to move the main cable devices 200, which are positioned on the mechanism rails 400, respectively, in the longitudinal direction to open or close the sunroof glass 101 and the sunshade 301.

The main cable device includes the two cables 600 which are moved in opposite directions by the rotation of the motor 500, and the two main cable devices 200 positioned at both sides of the mechanism rails 400 are configured to be moved in the same direction.

Figure 10A:
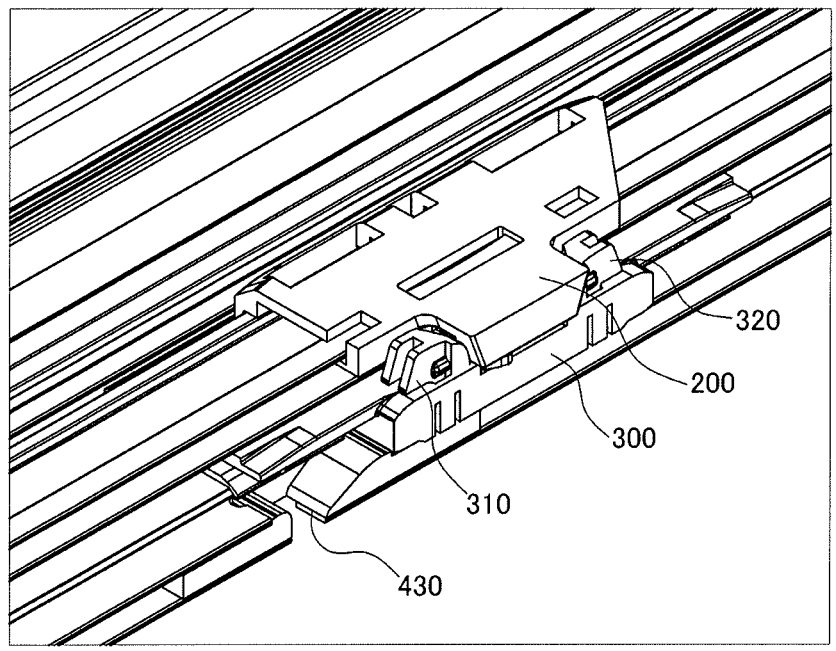
FIG. 10A illustrates the structure of a main cable unit and a sunshade sled being moved integrally according to one embodiment of the present invention.
Figure 10B:
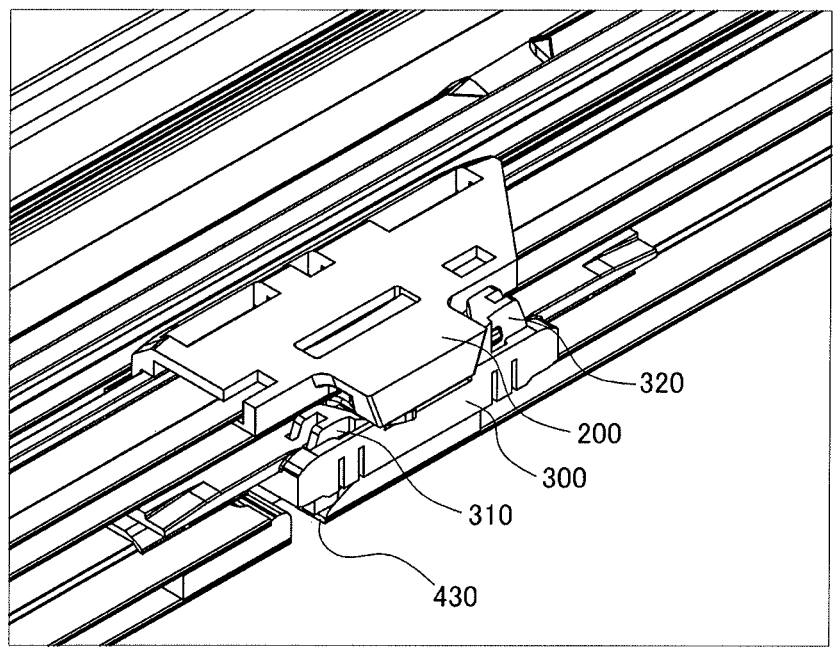
FIG. 10B illustrates the structure of a front stopper being inserted into a front constraining groove when the main cable unit and the sunshade sled are moved integrally according to one embodiment of the present invention.
Figure 10C:
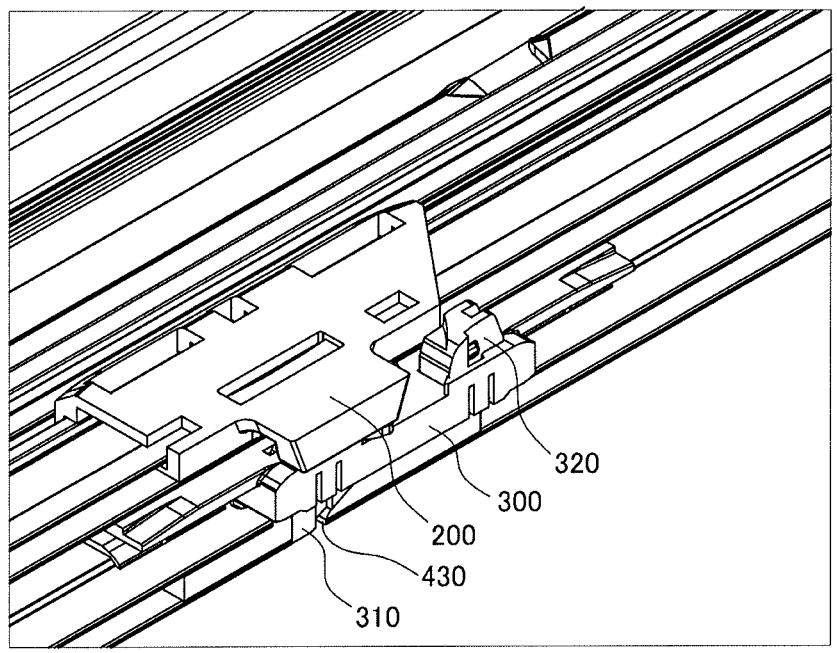
FIG. 10C illustrates the structure of the main cable unit moving independently of the sunshade sled in a state in which the front stopper is completely inserted into the front constraining groove according to one embodiment of the present invention.

FIGS. 10A to 10C illustrate an operational relationship in which the front stopper 310 is inserted into the front stopper constraining groove 430 as the main cable device 200 moves forward in the longitudinal direction of the vehicle according to the exemplary embodiment of the present invention.

The front constraining groove 410 is configured such that the front end portion of the front sled 110 is positioned and inserted into the front stopper constraining groove 430 in the state in which the sunroof glass 101 and the sunshade 301 are completely closed, thereby constraining the movement of the glass sled 100.

One end portion of the front sled 110 is configured to have a downward curvature, and when the cable protrusion 210 of the main cable device 200 is positioned at the front end portion of the glass groove 102, one end portion having the curvature is inserted into the front stopper constraining groove 410.

One end portion of the main cable device 200 is configured to provide longitudinal tension to one end portion that faces the front stopper 310, such that the main cable device 200 and the sunshade sled 300 are integrally moved.

At the position at which the front stopper 310 and the front stopper constraining groove 430 face each other, the front stopper 310 is inserted into the front stopper constraining groove 430, and the sunshade sled 300 is fixed to the mechanism rail 400.

The main cable device 200 is configured to apply force in a direction in which the front stopper 310 is inserted into the front stopper constraining groove 430 at the position at which the front stopper 310 faces the front stopper constraining groove 430. One surface of the front stopper 310, which faces one end portion of the main cable device 200, may be formed to be inclined.

When the front stopper 310 is inserted into the front stopper constraining groove 430, the main cable device 200 is unfastened from the sunshade sled 300 and additionally moves in the longitudinal direction of the vehicle.

The rear stopper 320, which is configured to correspond to the front stopper 310 in the longitudinal direction, may be inserted into the rear stopper constraining groove 440 as the main cable device 200 moves toward the rear side of the vehicle. When the rear stopper 320 is inserted into the rear stopper constraining groove 440, the fastened state between the main cable device 200 and the sunshade sled 300 is released, and the main cable device 200 may be additionally moved toward the rear side of the vehicle.

As described above, the front stopper constraining groove 430 and the rear stopper constraining groove 440 are configured to couple or uncouple the main cable device 200 and the sunshade sled 300.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of predetermined exemplary embodiments of the present invention have been presented for purposes of illustration and description. They are not intended to be exhaustive or to limit the invention to the precise forms disclosed, and obviously ma modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of an electric sunshade and a sunroof, the structure comprising:
    glass sleds which both open and close a sunroof glass by sliding in a longitudinal direction along mechanism rails disposed at a first side and a second side of a roof panel of a vehicle, and separately have a front sled and a rear sled at first and second end portions thereof, the front sled and the rear sled coupled to the first and second end portions and rotated;
    main cable devices which are connected to a driving actuator by a cable, and movable along the mechanism rails, and separately include a cable protrusion slidably accommodated in glass grooves formed in lateral surfaces of the front sled, the rear sled, and the glass sled; and
    sunshade sleds which are selectively coupled to the main cable devices, and slide to open or close the sunshade,
    wherein the sunshade sled includes stopper devices that protrude in a height direction to be selectively fastened in accordance with a movement direction of the main cable device, and the sunroof glass and the sunshade of the vehicle are opened or closed by the driving actuator.

2. The structure according to claim 1, including:
    tilt levers which are disposed at first and second end portions of the sunroof glass, are configured to be moved in upward and downward directions, and separately have a tilt groove; and
    a tilt protrusion portion which is disposed at a first side of each of the glass sleds, and configured to be movable along the tilt groove,
    wherein, when the glass sled moves forward thereof, the tilt protrusion portion moves the tilt lever upward to tilt up the sunroof glass.

3. The structure according to claim 1, wherein the stopper devices includes:
    a rear stopper which is configured to be movable rearward together with the main cable device; and
    a front stopper which is fastened to the main cable device and configured to be moved forward thereof.

4. The structure according to claim 3, wherein the rear stopper is unfastened from the main cable device when the sunshade is in a completely opened state.

5. The structure according to claim 1, wherein the front sled and the glass sled are coupled by a front hinge, the rear sled and the glass sled are coupled by a rear hinge, and an end portion of each of the front sled and the rear sled includes a shape curved toward the mechanism rails.

6. The structure according to claim 5, wherein in the mechanism rails, a front constraining groove is formed to be recessed to correspond to a position where an end portion of the front sled is seated, and a rear constraining groove is formed to be recessed to correspond to a position where an end portion of the rear sled is seated.

7. The structure according to claim 1, wherein a cable groove is disposed in a lower surface of the main cable device, a protrusion portion disposed on an upper surface of a sunshade rotation member is configured to be moved along the cable groove, the protrusion portion rotates while moving along the cable groove, and the main cable device and the sunshade sled are selectively constrained as the stopper devices are selectively inserted.

8. The structure according to claim 7, wherein the cable groove is recessed in a 'U' shape, wherein, when the protrusion portion of the sunshade rotation member is rotated, the main cable device and the sunshade sled are selectively constrained.

* * * * *